(12) United States Patent
Bonilla Gris

(10) Patent No.: US 7,628,569 B2
(45) Date of Patent: Dec. 8, 2009

(54) COVERING ELEMENT FOR PROTECTING STRUCTURES AGAINST SCOURING AND DRAG FORCE

(76) Inventor: Robi Bonilla Gris, Retorno de los Chapulines #316, Frac. Club de Golf, Tequisquiapan, OA (MX) 76750

( * ) Notice: Subject to any disclaimer, the term of this patent is extended or adjusted under 35 U.S.C. 154(b) by 4 days.

(21) Appl. No.: 11/995,514

(22) PCT Filed: Jul. 12, 2005

(86) PCT No.: PCT/MX2005/000052

§ 371 (c)(1),
(2), (4) Date: Jan. 11, 2008

(87) PCT Pub. No.: WO2007/008053

PCT Pub. Date: Jan. 18, 2007

(65) Prior Publication Data

US 2009/0052989 A1    Feb. 26, 2009

(51) Int. Cl.
*E02D 5/60* (2006.01)
(52) U.S. Cl. .................... 405/216; 405/211.1
(58) Field of Classification Search .......... 405/211, 405/211.1, 216; 114/243
See application file for complete search history.

(56) References Cited

U.S. PATENT DOCUMENTS

| | | | | |
|---|---|---|---|---|
| 3,224,406 A * | 12/1965 | Clark | ............... | 114/243 |
| 3,352,118 A | 11/1967 | Burkhardt | ............... | 405/211 |
| 4,341,489 A * | 7/1982 | Karnas | ............... | 405/35 |
| 4,398,487 A * | 8/1983 | Ortloff et al. | ............... | 114/243 |
| 4,700,651 A * | 10/1987 | Hale | ............... | 114/243 |
| 4,717,286 A * | 1/1988 | Loer | ............... | 405/74 |
| 4,984,218 A * | 1/1991 | Ritter et al. | ............... | 367/15 |
| 5,378,524 A * | 1/1995 | Blood | ............... | 428/141 |
| 5,722,340 A | 3/1998 | Sweetman | ............... | 114/243 |
| 6,092,766 A | 7/2000 | LaRoche et al. | ............... | 244/200 |
| 6,415,730 B1 * | 7/2002 | Barker | ............... | 114/243 |
| 6,669,408 B1 | 12/2003 | Woodall et al. | ............... | 405/211 |
| 6,685,394 B1 | 2/2004 | Allen et al. | ............... | 405/211 |
| 6,702,026 B2 * | 3/2004 | Allen et al. | ............... | 166/367 |
| 6,755,595 B2 * | 6/2004 | Oram | ............... | 405/216 |
| 2004/0013473 A1 | 1/2004 | Gibson | ............... | 405/211 |

FOREIGN PATENT DOCUMENTS

| | | | |
|---|---|---|---|
| DE | 27 44 277 | * | 4/1978 |
| WO | WO 0061433 | * | 10/2000 |
| WO | WO 02/095278 | | 11/2002 |

* cited by examiner

*Primary Examiner*—Frederick L Lagman
(74) *Attorney, Agent, or Firm*—Fulbright & Jaworski L.L.P.

(57) ABSTRACT

Sheath (20, 21) with specially designed artificial rugosity (18, 19), to be put on structures and objects (10) submerged in a flow (12) and leaning on a scourable bottom, such as piers and abutments of bridges, pipelines, and others. The rugosity diminishes the intensity of the secondary flow that occurs in the border of attack of the structure and also reduces the turbulent wake; as a result, there is a decrease in the local scour that can put the mentioned structures at risk. The sheath also reduces the drag force due to the relative movement of the structure (10) in relation to the liquid medium, so it can be applied to moving objects in a liquid medium at rest. The sheath may have an efficient streamlined profile that produces an additional decrease of the scour and the drag force; it may also include a mechanism to turn the sheath automatically, if the flow has variable direction.

26 Claims, 5 Drawing Sheets

COVERING ELEMENT FOR PROTECTING STRUCTURES AGAINST SCOURING AND DRAG FORCE

This application is a national phase application under 35 U.S.C. §371 of International Application No. PCT/MX2005/000052 filed 12 Jul. 2005. The entire text of the above-referenced disclosure is specifically incorporated herein by reference without disclaimer.

TECHNICAL FIELD

This invention refers to:

(a) an improvement in the prevention of scour or erosion around structures and objects submerged in a current or flow. Such structures can be piers and abutments of bridges, piles, columns, supports of structures or equipment or machines, pipelines and other conduits. The mentioned structures and similar objects can be anchored, sunk or buried in the bed or bottom or in the riverbanks of a ravine, a body of water or an artificial channel or in a fluvial, lacustrine, estuarine, coastal or marine environment.

(b) an improvement in the reduction of the drag force exerted by the water on structures and objects such as the structural elements of constructions located in a moving aquatic environment, for example: bridge piers, fixed and semisubmerged marine rigs, pipelines and ducts, maritime protection works, aquatic vessels and other structures and objects self-propelled or towed in aquatic environments.

BACKGROUND ART

A frequent problem in the case of structures and objects submerged in moving bodies of water is the local scour or erosion of material of the bottom in which they lean on, induced by the alteration of the current or flow caused by the presence of those structures and objects. This alteration consists of local increases of the velocity and in the onset of secondary flows and of turbulent wakes with whirls or vortices. The local scour removes material from the bottom around the structures and objects and can put at risk the support of the same, threatening their stability and security and those of the corresponding superstructure, if any.

In spite of the technical development achieved through research (theoretical, experimental and with the help of numeric simulation and with field studies), carried out in countless institutions in many countries, and in spite of the interest of the official institutions in charge of the ground communications infrastructure, and in spite of the enormous amounts of money invested in the search of solutions, scour is the main cause of the collapses of bridges, worldwide. 60% of those disasters are due to this phenomenon; because of that, nowadays it is still a factor of paramount importance in the design of these structures and an urgent technical challenge to solve (Refs. 1, 2, 3, 4, 5, 6, 30). (See LIST OF PRIOR ART REFERENCES, at the end of BACKGROUND ART).

In the state of Texas (United States), that has some 48,000 bridges and where between 200 and 300 bridges a year are built at an average cost of 500,000 dollars each, 1,000 bridges collapsed between 1961 and 1991; in the United States, 18,000 bridges are considered in critical state with regard to scour (Ref. 5). The great number of bridges (more than 575,000 in the United States, more than 156,000 in the United Kingdom) (Refs. 7, 8, 9) gives an indication of the problem dimensions and its dramatic economic impact. The costs directly related with the bridge collapses are always very high. For example, 19% of the United States federal emergency funds used in the item of highways is expended in the restoration of bridges; in the period 1980-1990, it amounted to an average of 20 million dollars annually (Ref. 3). It should be added to the previous costs the indirect costs due to the serious affectations to the roads and the dysfunctions in many activities; such costs can be even higher than the direct ones: the Federal Highway Administration of the United States estimates that these indirect costs can be five times the direct ones (Ref. 30). There is also a cost of prevention of those disasters: in the United States, about 15 million dollars have been spent in the last 8 years in research on bridge collapses, mainly due to scour in sandy bottoms (Ref. 5).

The collapses of bridges also imply an important risk for the public security: there have been lost human lives in those disasters.

The collapse of a bridge due to scour generally begins with the loss of support of one or more piers, which are the intermediate columns that support the superstructure of the bridge. One of the abutments can also fail; they are the supports at the ends of the bridge, where this structure rests on the riverbanks.

Other examples of structures susceptible to damage due to local scour are piles, columns, supports of structures or equipment or machines, pipelines and other conduits and similar structures, leaning, anchored, sunk or buried in the bed or bottom or in the riverbanks of a ravine, a body of water or an artificial channel or in a fluvial, lacustrine, estuarine, coastal or marine environment.

Local scour is produced by a complex turbulent flow that is mainly the effect of two independent, well-known mechanisms studied by multiple researchers. A brief explanation of those two different causes of the phenomenon follows which belongs to the state of the art and constitutes the base of my invention.

a). First mechanism: The horseshoe vortex. FIG. 1 shows a cylindrical submerged structure or object 10, leaning on a scourable or erodible bottom 11. The flow 12 that impinges against the border or attack area of the structure (the area that directly faces the current or flow) is deflected downward, generating this way a secondary flow that produces the so-called horseshoe vortex 13 when colliding against the bottom 11. This vortex surrounds the structure or submerged object and spreads downstream, removing material from the bottom 11 around the structure; this material is then transported by the current, giving place to the scour hole 15.

This first mechanism is very important in the case of submerged structures whose position is vertical or near it.

b). Second mechanism: von Karman vortices (FIG. 1).— The flow that surrounds the submerged structure or object 10 produces the vortices 14, called von Karman vortices. These vortices appear periodically and alternately from one side and the other of the structure and are carried away by the flow. These vortices, as small tornados, remove particles from the bottom 11 and put them into movement; the flow transports them and this is the second scour mechanism. The von Karman vortices are an important part of the wake caused by the presence of the structure or object in the flow.

The intensity of this second mechanism is related with the behavior of the boundary layer, the fluid layer of small thickness that flows in contact with the submerged structure or object. This boundary layer moves while remaining in contact with the structure until separation of flow occurs: the boundary layer comes off the structure and is carried away by the flow. FIGS. 2 and 3 show a well-known phenomenon of Fluid Mechanics: the intensity of the von Karman vortices and the dimensions of the turbulent wake depend, the remaining flow characteristics being equal, on the location of the points 16 of the perimeter of the structure 10 where the separation of flow occurs; the farther toward downstream are those points 16, the smaller dimensions the turbulent wake 17 will have and the less strong the von Karman vortices will be. In FIG. 3, the points of separation of flow 16 are farther downstream than in FIG. 2, so the produced turbulent wake 17 is smaller and the vortices have less intensity and, therefore, they produce less scour.

My invention acts against both scour mechanisms, as will be seen later in this document.

If the depth of the scour hole 15, basically due to the action of the two described mechanisms, surpasses certain magnitude, the support of the structure is reduced and its security is at risk.

In the case of structures and objects totally buried in the bottom or bed (such as river-crossing pipelines and submarine ducts), the scour, if it uncovers them, becomes more intense because of the vortices induced by the same structures and objects and exposes these to damages; this is why they may require frequent maintenance, and sometimes, repair or reconstruction.

As a conclusion, in all cases of structures and objects submerged in a moving liquid environment and leaning on or buried in the bottom, it is convenient to reduce the vorticity causing the scour, to increase the security of the structures or objects, to prolong their work life and to reduce the maintenance or repair costs.

The current state of the art consists on facing the problem with three main types of measures intended to reduce the scour effects around the submerged structure or object:

1. The protection of the bed or bottom near the submerged structure or object, using one or more of the following resources: rock, monolithic precast and cast-in-place concrete structures, crushed concrete, armor stone with granular filters (riprap), mattresses or mats of several types constituted by such heavy elements as bags made of plastic meshes or geotextiles containing concrete or stones, metallic cages containing stones (gabions), concrete blocks tied to each other by steel cables, buried columns of waste tires united by metallic elements, injections of fluid cement in the bottom under and around a submerged structure and mixing of this cement with the bottom granular material with the help of machines to solidify the support area, the generation of upward currents by means of small hydraulic machines to counteract the descending secondary flow, and other resources (Refs. 4, 9, 10, 11, 12, 13, 14, 15, 16, 17, 18, 19, 20, 21, 22, 23, 24, 25, 26, 27).

2. The construction on or near the submerged structure or object of some elements (generally, of reinforced concrete), whose position and shape help divert the flow and the scour away from the structure or submerged object, such as triangular or semicircular endnoses, "V" shaped flow deflectors, protection slabs, collars, sacrifice piles and other components (Refs. 4, 9, 10, 28, 29).

3. The construction or setting of the structure foundation to depths greater than the scour depths estimated by means of the available calculation formulae. The reason of this measure is that the formulae don't give reliable results; their error margins are generally big. The usefulness of the formulae is also limited because they don't consider the cases of complex flows, like those that include surf or currents; also, they don't take into account complex geotechnical characteristics of the bottom and are only applicable to simple shapes of piers.

The application of these three types of measures is always expensive: it requires additional materials, time and work, it implies the use of elements and materials whose preparation, transport and placement require special personnel, heavy equipment and particular techniques. The presence of surf or high-velocity flow complicates the maneuvers. Also, this type of solutions generally requires maintenance, which increases costs.

From the functional point of view, the described measures, which constitute the main body of the current state of the art, have as objective to reinforce the bed or bottom or to move the phenomenon of scour away from the structure or object to be protected, or set the structure to a depth that responds more to a collapse fear than to a rational, engineering decision. That is, the state of the art attempts, at great cost and without much success, to reduce the effects of local scour, without attacking to the cause of the phenomenon itself. The statistics of vulnerability of the submerged structures to the effects of local scour show that the protection obtained nowadays is faulty and that there is an urgent need of a better solution.

In the case of structures and objects buried in the bottom of a liquid mass in which there are currents, such as pipelines and conduits that cross water courses or lacustrine, estuarine, coastal or marine areas, the state of the art recommends measures like adding anchors or fastenings to the bottom and setting of the structures to considerable depths, which represent big costs.

The current state of the art doesn't consider, in none of the mentioned cases, the control of the hydrodynamics, responsible of the two main mechanisms that produce scour that were already described.

Regarding the drag force exerted by the moving water on the submerged structures and objects, or due to the movement of the objects in a motionless aquatic medium, in many instances it is convenient to diminish it to reduce the stresses those structures and objects must endure, due to security, economy and operative reasons.

The state of the art in respect to the drag force includes applying to the structures susceptible to the drag force some of the following measures. For fixed structures: giving the structures a massive nature, to increase their inertia, and additional structural reinforcement. For pipelines and other ducts: strong anchorages to the bottom and a structural design revised to resist the drag force. For semifixed structures: strong anchorages to the bottom and, if needed, special positioning mechanisms to counteract the movement and displacements. In the case of vessels: an appropriate hydrodynamic profile design.

The mentioned measures are, in general, costly.

In this document, in the description of the boundary layer behavior, it is stressed that the farther downstream the flow separation points are located, the lower will be the intensity of the turbulent wake. A weak turbulent wake produces less alteration in the flow, and the latter loses less energy and so the drag force exerted on the submerged structure will be smaller; this reduction occurs also if the structure or object is moving and the water is at rest.

The drag force reduction by diminishing the intensity of the turbulent wake is a known principle of Fluid Mechanics; however, it doesn't belong to the state of the art in the field of my invention.

Note: this invention has the same technical basis as the one I have named MOLDE PARA CREAR RUGOSIDAD ARTIFICIAL CONTRA LA SOCAVACIÓN, with applicant file reference 12136MOL, whose application I present simultaneously with this one and which refers to a different device.

LIST OF PRIOR ART REFERENCE

1. Jones, J. Sterling, Hydraulics Testing of Wilson Bridge Designs, Public Roads, Federal Highway Administration, U.S. Department of Transportation, http:/www.tfhrc.gov/pubrds/marapr00/hydra.htm
2. Khotyari, U. C.; Ranga Raju, K. G., *Scour Around Spur Dikes and Bridge Abutments*, Journal of Hydraulic Research, Vol. 39, 2001, No. 4.
3. U. S. Geological Survey, Bridge Scour.: It's Not Just Water Under the Bridge, http://www.usgs.gov/2001 openhouse/exhibits/35-bridgescour.html
4. Parker, Gary; Voigt, Rick, National Cooperative Highway Research Program, (NCHRP Project 24-7(2)), Countermeasures to Protect Bridge Piers from Scour, http://www4.trb.org/trb/crp.nsf/AII+Projects/NCHRP+24-07
5. Briaud, Jean-Louis, SRICOS Sheds Light on Bridge Scour Problems, Texas Transportation Institute, http://tti.tamu.du/product/ror/sricos.stm
6. Bell, Brian, Structural Integrity Monitoring Network (SI-MoNET), Bridge Scour—the challenge to the SIM industry, http://www.ojpweb.co.uk/simonet/forum/viewtopic.php?t=11
7. Weissmann, José; Haas, Carl, Bridge Foundation Scour Monitoring, The University of Texas, http://www.eng.utsa.edu/~josew/Scour.htm
8. Kamil H. M. Ali; Othman Karim, *Simulation of Flow Around Piers*, Journal of Hydraulic Research, Vol. 40, 2002, No. 2.
9. U. S. Department of Transportation, Federal Highway Administration, Summary of 1998 Scanning Review of European Practice for Bridge Scour and Stream Instability Countermeasures, http://www.fhwa.dot.gov/engineering/hydraulics/pubs/scanningreview1998/scantx t.cfm
10. Kim, Ung Yong; Ahn, Sang Jin, Scour Countermeasure around Bridge Piers using Protection Devices, http://kfki.baw.de/conferences/ICHE/2000-Seoul/pdf/251/PAP_263.PDF
11. St. Anthony Falls Laboratory, University of Minnesota, River Engineering at SAFL, http://www.safl.umn.edu/research/applied/re/index.html
12. Porraz Lando, Mauricio José, FORMAS MODULARES PARA FABRICAR RECUBRIMIENTOS ARTICULADOS DE ESPESOR, FILTRACIÓN Y RUGOSIDAD CONTROLADA (MODULAR FORMS TO MANUFACTURE ARTICULATED CONTROLLED THICKNESS, FILTRATION AND RUGOSITY COVERINGS) (Patent MX 204504, Oct. 4, 2001).
13. Porraz Jiménez, Mauricio, MEJORAS EN ELEMENTOS CONTENEDORES MIXTOS PLÁSTICO-TEXTILES PARA SER LLENADOS CON ARENA U OTROS MATERIALES GRANULARES O NO PARA CONSTRUCCIONES MARITIMAS Y ACUÁTICAS (IMPROVEMENTS IN PLASTIC-TEXTILES COMPOSITE CONTAINER ELEMENTS TO BE FILLED WITH SAND AND OTHER GRANULAR OR NONGRANULAR MATERIALS TO BE USED IN MARITIME AND WATER CONSTRUCTIONS) (Patent MX 163867, Jun. 29, 1992).
14. González Herrera, Rafael, MEJORAS EN PROCEDIMIENTO PARA LA COLOCACIÓN DE FAJINAS BAJO EL AGUA EN DESPLANTES DE ESCOLLERAS, ROMPEOLAS O ESTRUCTURAS SIMILARES (IMPROVEMENTS IN PROCEDURE OF LAYING ON OF UNDERWATER FASCINES IN JETTIES, BREAKWATERS AND SIMILAR STRUCTURES LAY OUT) (Patent MX 167267, Mar. 12, 1993).
15. Yoshino, Masato; Ishikawa,Yoshikazu, MATERIAL AND CONSTRUCTION METHOD OF PREVENTION OF SCOUR FOR THE UNDERWATER STRUCTURE (U.S. Pat. No. 6,305,876 B1, Oct. 23, 2001).
16. Bilanin, Alan J., SYSTEM FOR ALLEVIATING SCOURING AROUND SUBMERGED STRUCTURES (U.S. Pat. No. 5,762,448, Jun. 9, 1998).
17. Yasuhiro, Murakami, SCOUR PREVENTIVE MATERIAL (Patent JP 2000319842, Nov. 21, 2000).
18. Naoki, Noguchi et al., PREVENTING METHOD FOR SCOUR (Patent JP 56046011, Apr. 27, 1981).
19. Yasuhiro, Iwasaki, PREVENTION OF SCOURING OF BOTTOM-LANDING TYPE MARINE STRUCTURE (Patent JP 58185811, Oct. 29, 1983).
20. Mamoru, Takasaki et al., SCOURING-PREVENTING DEVICE (Patent JP 61277708, Dec. 8, 1976).
21. Matsuhei, Ogawa, SCOURING PREVENTION WORK FOR UNDERWATER STRUCTURE (Patent JP 61242209, Oct. 28, 1986).
22. Hitoshi, Hatano, METHOD OF PREVENTING SCOURING OF UNDERWATER STRUCTURE (Patent JP 61134409, Jun. 21, 1986).
23. Larsen Ole, APPARATUS FOR PREVENTING AND REDUCING SCOURS IN A BED SUPPORTING A BODY OF WATER (Patent GB 1383012, Feb. 5, 1975).
24. Texaco Development Corp., ARTICULATED ANTI-SCOUR MAT FOR MARINE STRUCTURES (Patent GB 1472486, May 4, 1977).
25. Lee, Keun-Hee, METHOD FOR CONSTRUCTING SCOUR PROTECTION OF BRIDGE AND STABILIZATION OF STREAM BED USING BLOCK MAT (International Patent Application PCT/KR10/01823, Oct. 26, 2001).
26. Larsen, Ole Fjord, APPARATUS FOR PREVENTING EROSION OF THE SEABED IN FRONT OF HYDRAULIC STRUCTURES (U.S. Pat. No. 4,114,394, Mar. 8, 1977).
27. Kazuo, Ishino, SCOUR PREVENTING CONSTRUCTION METHOD (Patent JP 2000144675, May 26, 2000).
28. U. S. Federal Emergency Management Agency, Flood Handbook, Chapter 3: Bridges, D. Scour (Piers & Abutments), www.conservationtech.com/FEMA-WEB/FEMA-subweb-flood/01-06-FLOOD/3-Bridges/D.Scour.htm
29. Hadfield, A. C.; Melville, B. W. *Use of Sacrificial Piles as Pier Scour Countermeasures. Technical Note*, Journal of Hydraulic Engineering, Volume 125, No. 11, 1999, American Society of Civil Engineers.
30. Annandale, George W.; Melville, Bruce; Chiew, Yee-Meng, SCOUR CASE STUDIES, Mitteilungsblatt der Bundesanstalt für Wasserbau Nr. 85 (2002) (Information Newsletter No. 85 (2002) of the Federal Institute of Rivers and Channels Engineering and Research (Germany)).

DISCLOSURE OF THE INVENTION

This invention faces the problem of local scour attacking its origins itself, modifying advantageously the flow near the submerged structure or object, in order to reduce the intensity of the two main scour mechanisms already described, and also that of the drag force.

My invention is a specially designed sheath to be placed in the surface of the structures and objects submerged in a current or flow. This sheath can also be placed on or applied to other structures and objects that lean on or are anchored to or buried in the bottom or in the riverbanks of ravines or in fluvial, lacustrine, estuarine, coastal and marine bodies of water, objects such as pipelines and other conduits and objects, that can also induce scour and can be affected by the corresponding problems and risks, and also suffer the disadvantageous effects of the drag force.

It can also be applied to objects that move in a motionless liquid medium to reduce said drag force.

This sheath has the following basic characteristics:

(a) A specially designed artificial rugosity whose characteristics will be described later on.

This rugosity has a decisive influence on the hydrodynamic conditions governing the scour, since it reduces the secondary flow and the corresponding horseshoe vortex and also weakens the turbulent wake generated by the flow around the structures and objects; due to this last effect, it also reduces the action of the drag force.

The current state of the art doesn't take into consideration the characteristics of the surface of the submerged structures; the general use is to give a smooth finish to this surface in the case in which the structure is formed in a mold (as is the most frequent case, of concrete structures), and to conserve the natural rugosity of the construction material, in other cases.

(b) Optionally, an efficient hydrodynamic, streamlined profile that reduces further the horseshoe vortex and produces a minimum turbulent wake and a minimum drag force, due to its geometry.

In the current state of the art, it is generally inconvenient to give the submerged structures and objects a hydrodynamic (streamlined) profile, due to structural design reasons and also due to high construction costs because molds of complex geometry are needed, when the structures or the objects are built of reinforced concrete or another formed material. When the objects have a determined shape, such as pipelines and other conduits, the impossibility of a shape change is evident.

(c) Optionally, a pivotably mounted mechanism that allows the sheath to rotate around the submerged structure to adjust itself automatically to the direction of flow, when the latter presents different directions in the course of time and it is feasible to add this mechanism.

As a result of the action of the mentioned characteristics, the use of my sheath reduces the local scour, resulting in an increased security of the submerged or buried structure or object, in an extension of its work life and in savings in the construction, maintenance and repair costs, if any; all this, at a reduced relative cost. In the case of structures susceptible to the action of the drag force, the reduction of this latter is an additional advantage.

The hydrodynamic principles in which my sheath is based belong to the state of the art of Fluid Mechanics; their presentation began in the section of Background Art and will continue later on.

The artificial rugosity of my sheath is of two specific types; each one of them has its own characteristics and acts in an especially effective way against one of the two mechanisms of generation of vortices described above and against the drag force.

The types of artificial rugosity and their operation are:

1. Directional rugosity 18 (FIG. 5, FIG. 6).—It attacks efficiently the first scour mechanism (horseshoe vortex). I recommend creating this type of artificial rugosity in the border or area of attack of the sheath (the area facing the direction the current or flow comes from), especially in the case of structures and objects in vertical position or near that position. This directional rugosity should be preferably constituted by linear rugous elements in form of stripes: grooves (in bas-relief) or salients (in high relief). I recommend the outline of these stripes being such that fulfills one of the two following conditions, or a combination of both:

a). It guides the secondary flow, that travels next to the attack area of the sheath, toward the foot of the submerged structure or object, deviating it, preferably gradually, from the descending vertical direction (in the upper portion) toward the horizontal direction (in the lower portion) so that this secondary flow behaves in one or in the two following ways:

a1). It surrounds the sheath along both sides and incorporates to the current without arriving to the bottom at the foot of the structure;

a2). Its flow lines collide with each other, losing descending vertical dynamic energy.

b). It promotes the formation of vortices along the descending path of the flow; these vortices subtract energy from the secondary flow and tend to be carried away by the current before arriving at the bottom.

In both cases the magnitude of the secondary flow that impinges in the bottom diminishes and, therefore, weakens the horseshoe vortex.

2. Nondirectional rugosity 19 (FIG. 4, FIG. 5, FIG. 6).—It is especially effective against the second scour mechanism (von Karman vortices) and against the drag force, although it also acts against the first mechanism (horseshoe vortex) if it is applied in the border or area of attack of the sheath. I recommend using this artificial directional rugosity in the surface of the sheath that doesn't belong to the border or attack area.

FIG. 4 shows a type of nondirectional rugosity; it consists on a group of dot rugous elements 19 in bas-relief or in high relief, of such shape, size and distribution that cause that the laminar boundary layer (formed by particles that flow orderly) that moves in contact with the surface of the sheath, becomes turbulent (formed by particles that flow chaotically). This transformation gives as a result that the separation of this boundary layer (FIG. 3) happens at points 16 located downstream from the points corresponding to a smooth surface (FIG. 2), reducing this way the dimensions and the intensity of the turbulent wake 17 of the sheath. This produces a smaller scour, as was explained in the section relative to the state of the art. Additionally, it reduces the drag force acting on the submerged structure.

In comparison with the different measures and solutions provided by the state of the art, commented in this document, my invention, besides being efficient in the reduction of the scour and the drag force, presents the following advantages:

(a) It can be applied, as preventive measure against local scour and the drag force, to recently built or placed submerged structures and objects; also, as attenuation measure, can be applied to others that already run risks or have problems due to this phenomenon.

(b) It allows a significant reduction in the costs of protection against local scour and the drag force, since the application or the putting on of the sheath doesn't require additional work bulk, nor heavy equipment, or additional construction time.

(c) It diminishes in a substantial amount the maintenance or repair costs of the means or resources used against the scour and minimizes or eliminates the necessity of protecting the bottom and building appendices or other works.

(d) It resists any hydrodynamic conditions of velocity and turbulence, contrary to many of the measures against the scour that use elements placed in the bottom, and others.

(e) The optional streamlined profile of the sheath is independent of the profile of the submerged structure or object, so that it can be applied to any form of horizontal section of such structure or object.

(f) Using the appropriate material, the sheath helps to protect the submerged structure or object against the damage caused by the impact of floating bodies carried by the flow and of boats.

(g) It doesn't produce parasite scour effects downstream of the submerged structure that can end up affecting the structure, contrary to some of the solutions belonging to the state of the art.

(h) The sheath is applied or placed below the water level, so that it isn't visible from outside of the flow and so doesn't interfere with the aesthetics of the structure nor of the supported superstructure.

(i) The technology is simple, of easy transfer and application.

A detailed analysis of the description of my invention and of the corresponding figures allows finding other use modalities and advantages of my invention in comparison with the state of the art.

The use of a sheath with artificial rugosity to reduce the intensity of the turbulent wake as a means to diminish local scour and the drag force in submerged structures and objects constitutes an important technical novelty of my invention and is an original application of this effect of wake reduction, already known by the Fluid Mechanics and applied in a different field of knowledge. Artificial rugosity is applied in the balls used in some sports (baseball, tennis, golf to reduce the turbulent wakes that these balls form in the air, with the objective of reducing the drag force, opposed to movement, achieving greater velocities and longer trajectories of said balls.

The advantageous results of the application of my invention's artificial rugosity in reducing local scour have been proven with 2 experimental studies in a Hydraulics laboratory, using scale physical models with the characteristics indicated in the following abbreviated description; in this description the following dimensionless hydrodynamic parameters, of common usage in Hydraulics, are used:

Froude Number:

$$F = \frac{U}{\sqrt{gd}}$$

Where U is the mean velocity of the flow, g is the acceleration due to gravity and d is the flow depth.

Reynolds Number:

$$R = \frac{UD}{v}$$

where U is the mean velocity of the flow, D is the diameter of the cylindrical pier and v is the coefficient of kinematic viscosity of the liquid.

In the first study, a channel of rectangular section 0.56 meters wide, a flow of 21.6 liters/second was used and as bottom material, ground bakelite with an initial transport velocity of 0.14 meters/second. In the experiment, cylindrical piers with a 0.07 meters diameter were used and the flow depth was 0.27 meters. The Froude Number was 0.09 and that of Reynolds, $8.8 \times 10^3$.

The second study was carried out in a channel of rectangular section 1.50 meters wide, with a flow that varied between 49.5 and 59.4 liters/second; the material of the bottom was sand and its initial transport velocity was 0.22 meters/second. Artificial rugosity was applied to cylindrical piers 0.10 meters in diameter; the flow depth varied from 0.12 meters to 0.20 meters. The values of the Froude Number varied between 0.14 and 0.27 and the values of the Reynolds Number, varied between $1.7 \times 10^4$ and $2.7 \times 10^4$.

The results of both laboratory studies showed a significant reduction of the depth and volume of the scour hole in piers with different alternatives of the artificial rugosity, in comparison with the values corresponding to the smooth pier under the same hydrodynamic conditions.

By the reasons previously described, it can be seen that my sheath represents a considerable advance in the solution of the problem related to local scour around the submerged structures and to the drag force on them. The solution here presented increases the security of those structures, increases their work life and reduces their costs and the construction times, those of maintenance and, eventually, those of repair or reconstruction. Also, with the appropriate characteristics, gives these structures a protection against impacts of floating objects and boats.

BEST MODE FOR CARRYING OUT THE INVENTION

Figure 1:
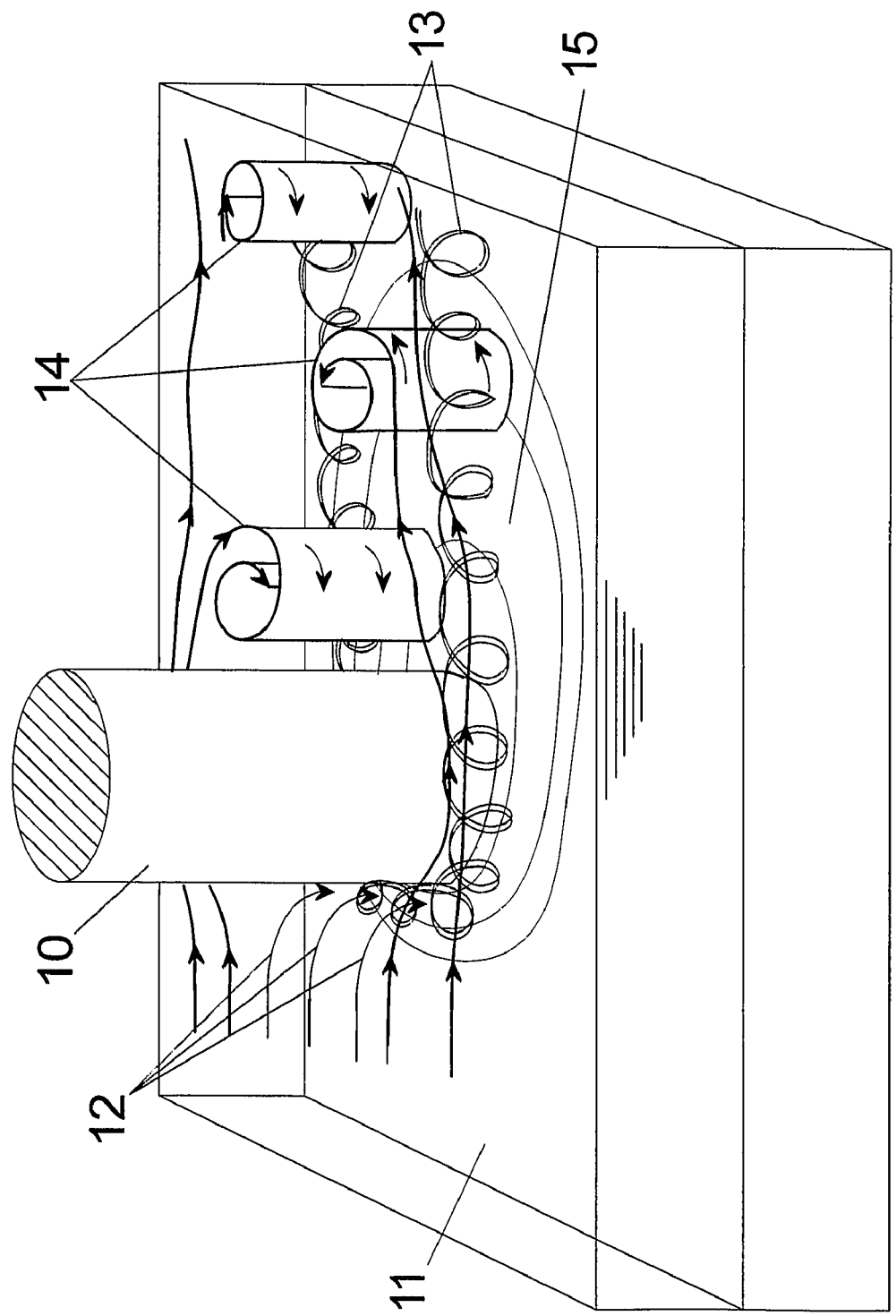
FIG. 1 Local scour mechanisms (perspective view) (PRIOR ART)
Figure 2:
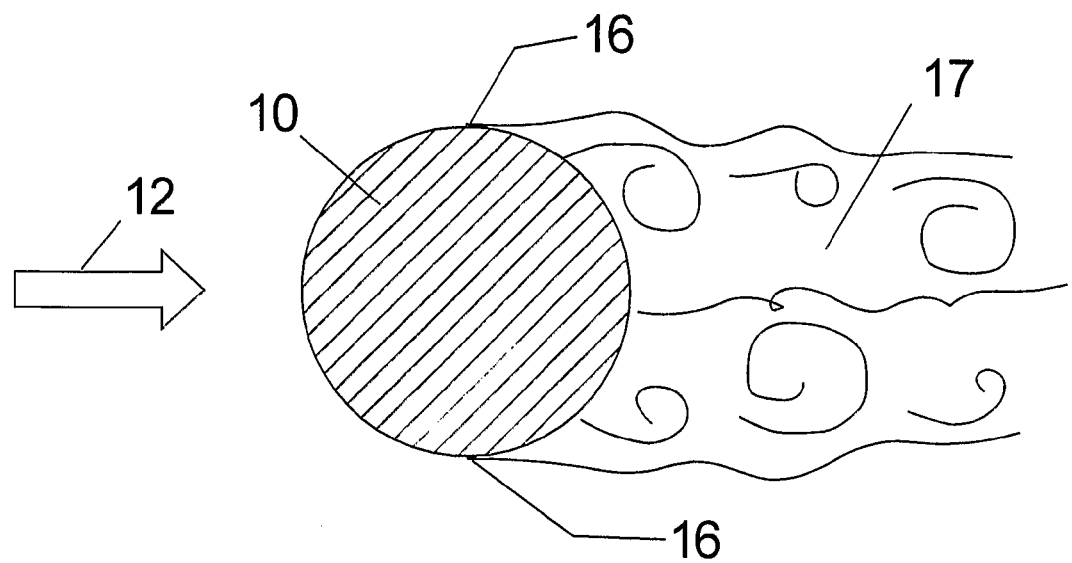
FIG. 2 Turbulent wake of great magnitude and great intensity (plan view) (PRIOR ART)
Figure 3:
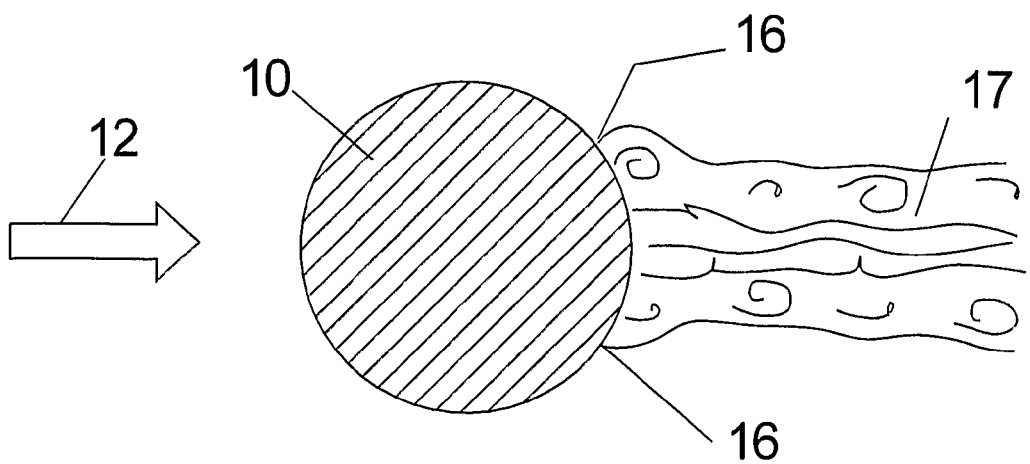
FIG. 3 Turbulent wake of small magnitude and small intensity (plan view) (PRIOR ART)

I present the following recommendations to carry out my invention, as an example and not with the intention of unduly limiting the reach of the same.

I recommend my sheath being constituted by an ensemble of one or more intermediate layers or components 21 (FIG. 5, FIG. 6) that wrap concentrically the submerged structure 10, contained one component inside another, if there is more than one; this ensemble is fixed to the structure (if there is no self-orienting mechanism) and serves as support to the cover 20 that has the artificial rugosity (18, 19) in its external face.

I recommend the rugous cover 20 being formed out of a flexible, weather- and water-proof material, as well as resistant to the particular characteristics of the flowing liquid. For example, in the estuarine, coastal and marine areas, it must be resistant to brackish or salted water, according to the case. It should also have appropriate mechanical characteristics to be fastened directly around the submerged structure or object, if no intermediate elements are present, and to remain this way; also, it should resist the action of slight floating objects carried by the flow. This material should also fulfill the environment protection standards. The material could be synthetic, as a polymer or another appropriate material.

I recommend the intermediate component or components 21 being manufactured from a material which can be conveniently formed and keep this form and dimensions along the work life of the sheath. This intermediate component 21 should also be capable of being held by means of a simple procedure to the structure or object to be protected; for example, it can be made up of two or more complementary parts that can be united to each other in a simple way. The intermediate component 21 should also be capable of holding fast the cover 20. Its mechanical properties should be similar to those of the cover 20, besides being able to resist considerable impacts coming from floating objects and of boats, to help protect the submerged structures from those effects.

Figure 5:
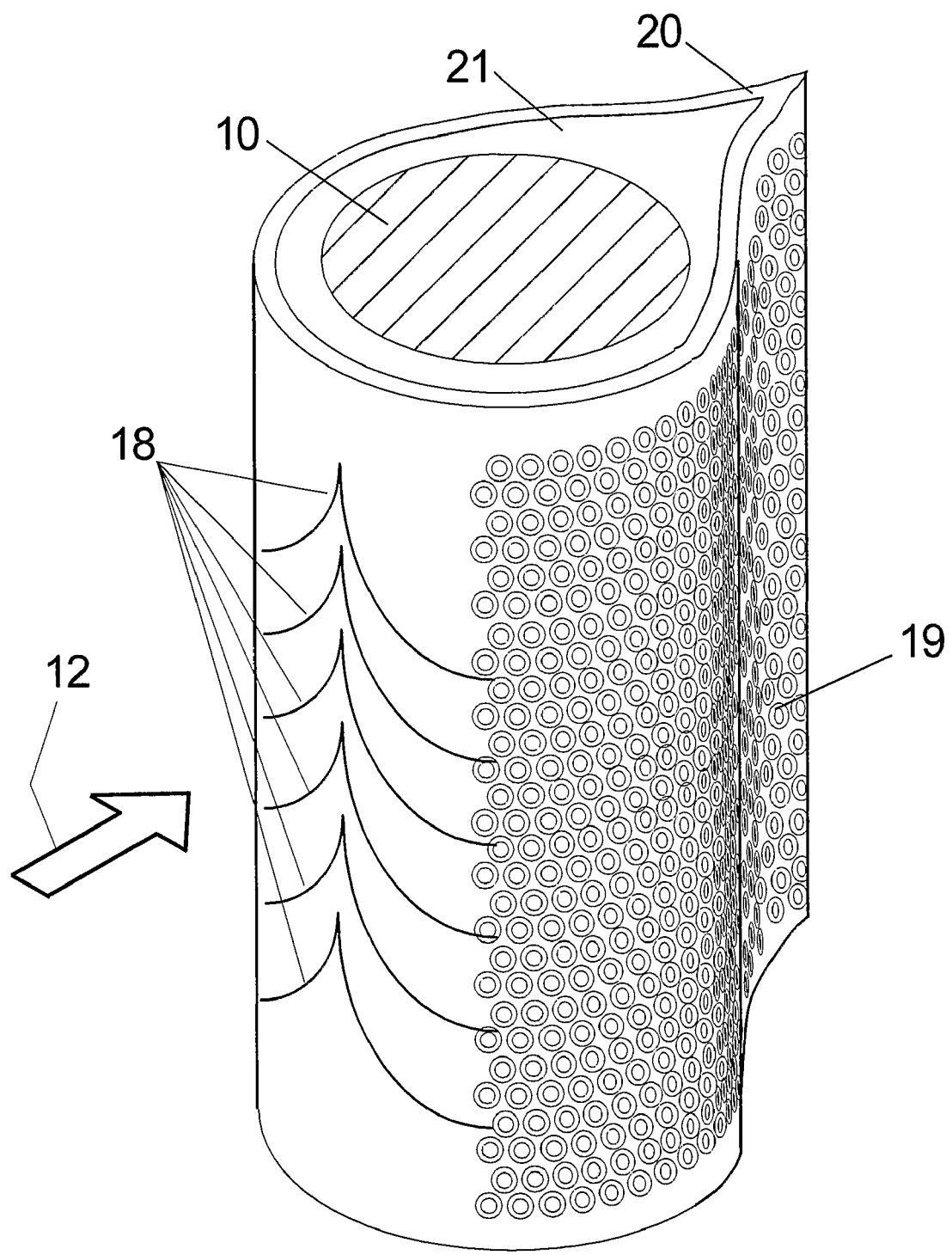
FIG. 5 Sheath with directional and nondirectional rugosity, and hydrodynamic profile (perspective view).
Figure 6:
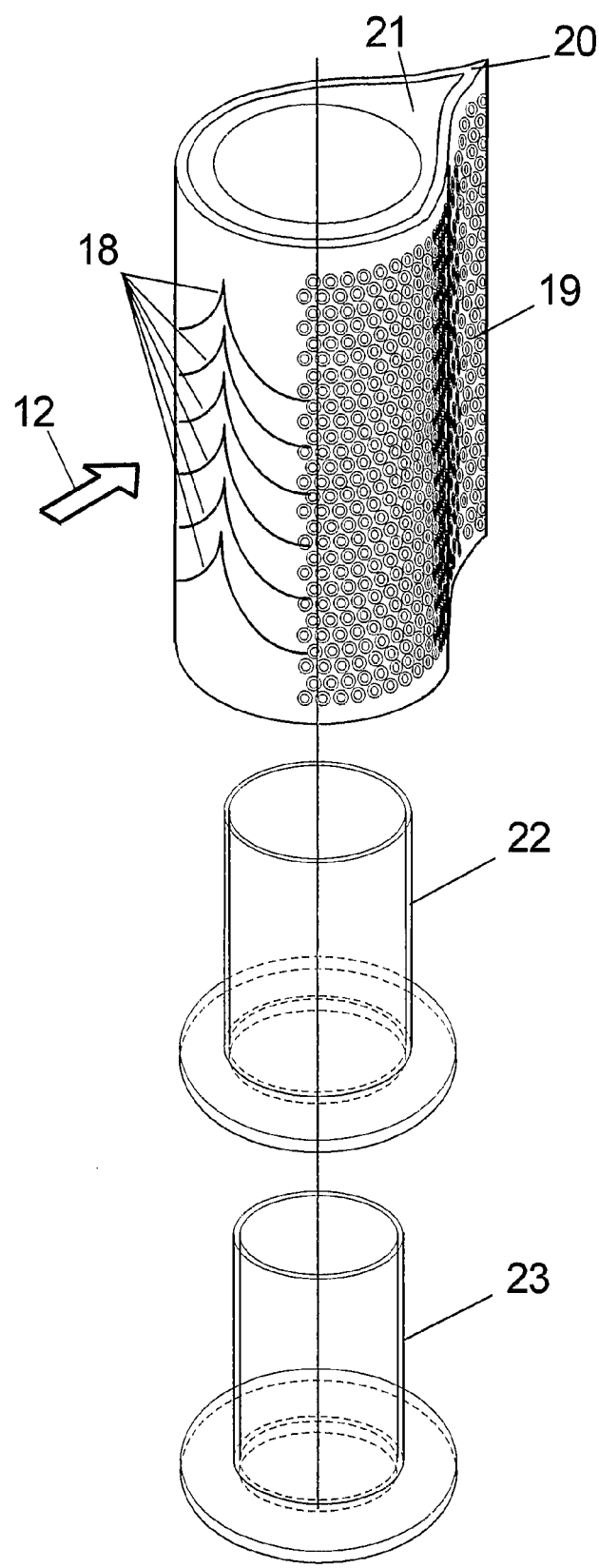
FIG. 6 Sheath with directional and nondirectional rugosity, hydrodynamic profile and automatic orientation mechanism (exploded view).

I also recommend my sheath having an efficient hydrodynamic (streamlined) profile, if the conditions are appropriate (see next three paragraphs), to produce an even more reduced secondary flow and a minimum turbulent wake (FIG. 5, FIG. 6).

There are structures and objects located in ravines and in bodies of water in which the current or flow maintains approximately a single direction, as is the case of piers and abutments of bridges in rivers without tide influence. In that case, I recommend creating or applying the two rugosity types in the sheath: the directional rugosity (or a combination of the two rugosity types) in the attack area and the nondirectional rugosity in the rest of the sheath. I also recommend giving the sheath a hydrodynamic (streamlined) profile.

FIG. 5 shows a sheath with directional rugosity 18, nondirectional rugosity 19 and hydrodynamic profile, applied to a cylindrical submerged structure.

In the case of pipelines and other ducts, I recommend putting the cover 20 of my sheath directly on the object, having the nondirectional rugosity.

In the case of structures and objects submerged in water bodies in which the flow can change its direction, like in lacustrine, estuarine, coastal or marine areas, or in rivers with tide influence, I recommend my sheath being put with a circular profile and with one type of rugosity or with a combination of both types. Better yet, in the case of vertical structures, I recommend my sheath having a streamlined profile and a mechanism that orientates it automatically in the direction of flow (FIG. 6), if it is possible.

The recommended hydrodynamic profile for a given sheath depends on the shape and dimensions of the structure or object to be protected from local scour, as well as on the hydrodynamic conditions of the flow. The state of the art has diverse resources to design said profile.

I recommend that the orientation mechanism allowing the sheath to rotate around the submerged structure to follow automatically the flow direction includes (FIG. 6):

(a) the cover 20 having the artificial rugosity in its exterior surface;

(b) one or more intermediate components 21 with the streamlined profile, that holds inwardly the sleeve 22 described in the following paragraph and outwardly the cover 20 that contains the rugosity. This intermediate component can be integrated by two or more complementary parts which can be united to each other in a simple way;

(c) a tubular sleeve 22 provided with a flange in its lower end (and, if needed, also in its upper end), made of a self-lubricant material, such as a plastic with very low friction coefficient, and with the advisable mechanical properties for its operation and for the environment in which it is set. This sleeve can be integrated by two or more complementary parts that can be assembled in a simple way. Said sleeve 22 is fixed to the inside of the intermediate layer or layers 21 and its size is such that it can contain concentrically the axis case 23 described in the following paragraph with enough mechanical tolerance so that it can rotate freely around this axis case 23.

(d) a tubular axis case 23, also provided of a flange in its lower part (and, if needed, also in its upper end) and made of the same material as the sleeve 22 or of a similar material. This axis case 23 is contained inside the sleeve 22 and is fixed to the external surface of the submerged structure or object. The axis case 23 can be integrated by two or more complementary parts that can be assembled in a simple way The flange of the sleeve 22 leans on and rotates on the flange of the axis case 23, allowing in that way the automatic orientation of the sheath according to the direction of flow.

My sheath can also consist of only the cover 20, containing the artificial rugosity in its external face, directly fastened to the submerged structure.

I recommend the following characteristics to be given to the two types of artificial rugosity of my invention.

1. Directional rugosity.

FIG. 5 and FIG. 6 show one of the possible outlines of the linear rugous elements following the recommendations given in the disclosure of the invention; the stripes 18 shown in the figure are a family of elliptic curves whose smaller axis is vertical and whose bigger axis is horizontal. Such lines can be traced with other forms: arcs of circles, parabolas, irregular curves, straight line segments, etc. The stripes can be substituted by dot rugous elements aligned according to the mentioned lines; the description of the dot rugous elements appears later on, in the paragraph 2, treating the nondirectional rugosity.

The basic geometric characteristics that I recommend for this rugosity type are the following ones:

a. Grooves (in bas-relief):

Grooves with a depth 0.5 centimeters to 5 centimeters and a semicircular or rectangular traverse section, with a width equal to double the depth. I recommend a free space among grooves being approximately equal to the depth. These grooves, however, can have other forms of traverse section and other dimensions and proportions. The grooves can be substituted by depressions or spaces among series of dot rugous elements aligned according to the mentioned curves; the description of the dot rugous elements appears later on, in the paragraph 2, treating the nondirectional rugosity.

b. Salients (in high relief):

Height of the salients: 0.5 centimeters to 5 centimeters; I recommend their traverse section being preferably rectangular with slightly rounded edges, with a width equal to double the height. A free space among salients approximately equal to the height is recommended. The mentioned salients can have other shapes of traverse section and other dimensions and proportions.

The salients can be substituted by dot rugous elements aligned according to the aforementioned curves; the recommended description of the dot rugous elements appears later on, in the paragraph 2.

2. Nondirectional rugosity

Figure 4:
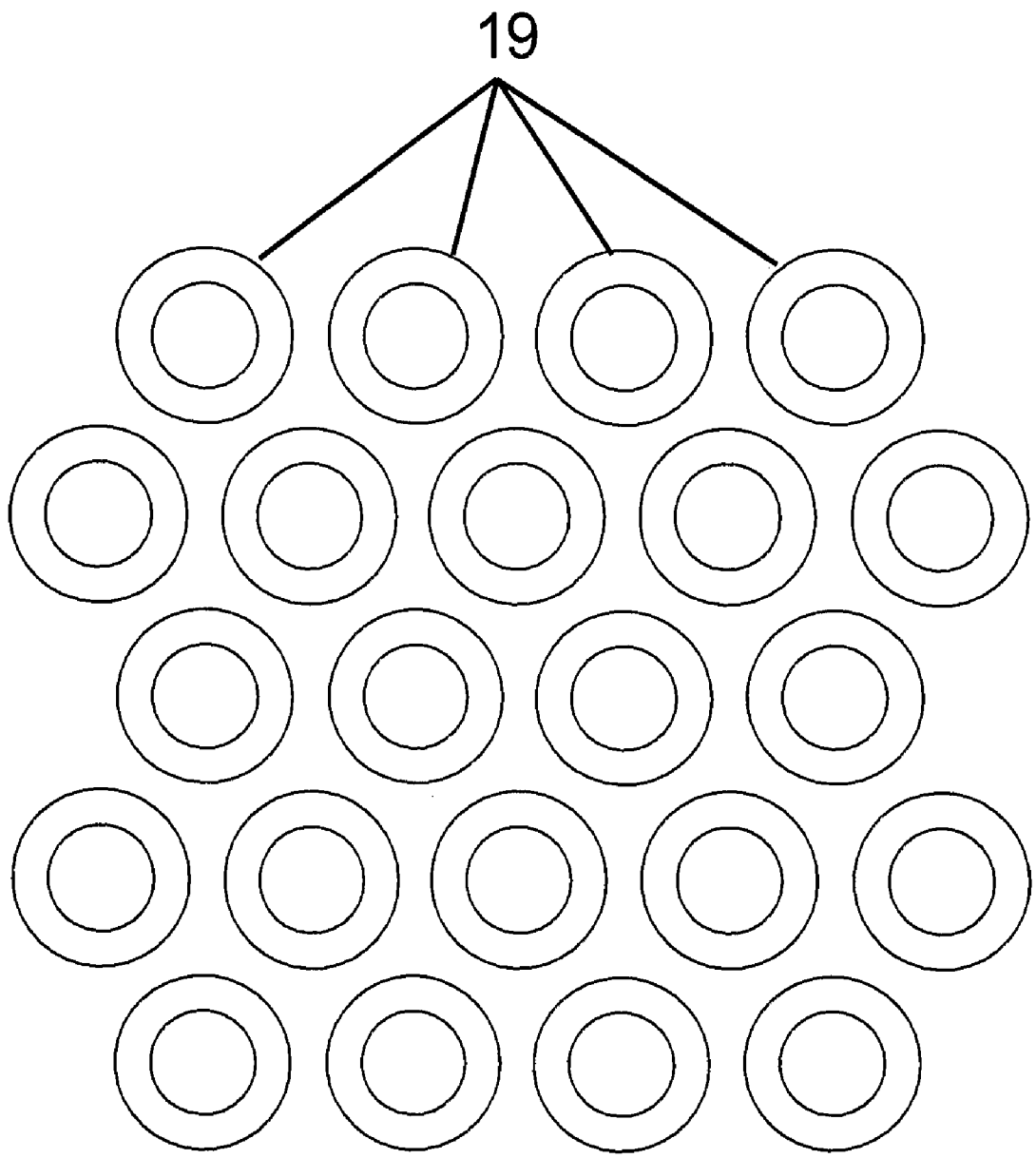
FIG. 4 Nondirectional rugosity (front view)

The basic characteristics that I recommend for this type of artificial rugosity are the following:

a). Shape and size of the dot rugous elements: preferably, grooves (in bas-relief or salients (in high relief with circular outline and semicircular traverse section. FIG. 4 shows their recommended geometry. I recommend the external diameter being from 1 centimeter to 5 centimeters and the inside diameter, 0.6 centimeters to 3 centimeters, maintaining a relationship of approximately 5/3 between external and internal diameters. Said elements can also have other forms, as: spherical sector, cylinder, cube, etc. and also have other sizes. The proportions between the mentioned dimensions can also be different.

b). Distribution of the elements (FIG. 4): preferably, staggered; this is, in parallel lines so that the elements of a line correspond with the spaces of the following line, forming a net of equilateral triangles. I recommend the free space between elements being approximately equal to the difference between the external and inside diameters of the preceding paragraph. Other distributions can also be used: rectangular, rhomboidal, irregular, etc.

Although in this document recommendations are given regarding the characteristics of my sheath, said recommendations have the object of illustrating the use of the invention and therefore are not restrictive; it is possible to make different combinations, modifications and additions to those characteristics, without changing the spirit or the reach of my invention, just as they appear in the claims.

INDUSTRIAL APPLICABILITY

My invention can be used to increase the security against local scour and increase the work life, as well as reduce the construction, maintenance, repair or reconstruction costs of structures and objects submerged in a current or flow. Those structures can be piers and abutments of bridges, piles, columns, equipment and machinery supports, pipelines and other conduits and structures and similar objects. Those objects can be leaning on, anchored to, sunk or buried in the bottom or in the riverbanks of ravines or in fluvial, lacustrine, estuarine, coastal and marine environments susceptible to scour due to water streams, permanent as well as ephemeral, or in artificial conduits.

My invention can also be used to reduce the drag force exerted on fixed, semifixed and mobile structures in whose design that force must be taken into account, such as fixed and semisubmersible marine rigs, river-crossing and marine pipelines, maritime protection works, aquatic vessels and other objects and structures self-propelled or towed in aquatic environments.

My sheath can also be used to reduce the turbulent wake produced by structures and objects submerged in a flow and that belong to hydraulic works, such as columns and walls supporting gates, crossing and control structures, walls and columns in pump sumps, etc.

Having sufficiently described my invention, I consider a novelty and therefore I claim as of my exclusive property what is contained in the following clauses:

1. An apparatus for reducing scour, the apparatus comprising:
   a sheath configured to extend at least partially around a submerged object; and
   a plurality of rugous elements disposed on the sheath, wherein:
     the sheath comprises an attack area;
     a first portion of the rugous elements are arranged to provide directional rugosity in the attack area;
     a second portion of the rugous elements are arranged to provide non-directional rugosity outside of the attack area.

2. The apparatus of claim 1 wherein the first portion of the rugous elements are shaped to form curves.

3. The apparatus of claim 2 wherein the curves are elliptical curves.

4. The apparatus of claim 1 wherein the first portion of the rugous elements comprise grooves.

5. The apparatus of claim 4 wherein the first portion of the rugous elements have a width that is substantially equal to twice the depth.

6. The apparatus of claim 4 wherein the first portion of the rugous elements have a rectangular cross-section.

7. The apparatus of claim 4 wherein the first portion of the rugous elements have a semi-circular cross-section.

8. The apparatus of claim 4 wherein the first portion of the rugous elements have a depth of between approximately 0.5 centimeters and 5 centimeters.

9. The apparatus of claim 4 wherein the space between the grooves is approximately equal to the depth of the grooves.

10. The apparatus of claim 1 wherein the first portion of rugous elements comprise salients.

11. The apparatus of claim 10 wherein the first portion of the rugous elements have a width that is substantially equal to twice the height.

12. The apparatus of claim 10 wherein the first portion of the rugous elements have a rectangular cross-section.

13. The apparatus of claim 10 wherein the first portion of the rugous elements have a semi-circular cross-section.

14. The apparatus of claim 10 wherein the first portion of the rugous elements have a height of between approximately 0.5 centimeters and 5 centimeters.

15. The apparatus of claim 1 wherein the sheath comprises a hydrodynamic profile.

16. The apparatus of claim 1 wherein the sheath is configured to rotate freely around the submerged structure.

17. The apparatus of claim 1 wherein the sheath is configured to align with a direction of fluid flow around the submerged object during use.

18. The apparatus of claim 1 wherein the second portion of the rugous elements comprise circular grooves.

19. The apparatus of claim 1 wherein the second portion of the rugous elements comprise salients.

20. An apparatus for reducing scour, the apparatus comprising:
    a sheath configured to extend at least partially around a submerged object;
    an attack area on the sheath; and
    a plurality of rugous elements in the attack area, wherein the plurality of rugous elements are arranged to form curves, and wherein the sheath further comprises non-directional rugous elements outside of the attack area.

21. The apparatus of claim 20, wherein the rugous elements comprise grooves.

22. The apparatus of claim 20, wherein the rugous elements comprise salients.

23. The apparatus of claim 20 wherein the curves are elliptical curves.

24. The apparatus of claim 23 wherein the vertical axis of the elliptical curves is smaller than the horizontal axis.

25. The apparatus of claim 20 wherein the sheath comprises a hydrodynamic profile.

26. The apparatus of claim 20 wherein the sheath is configured to rotate freely around the submerged structure.

* * * * *

UNITED STATES PATENT AND TRADEMARK OFFICE
CERTIFICATE OF CORRECTION

| | | |
|---|---|---|
| PATENT NO. | : 7,628,569 B2 | Page 1 of 1 |
| APPLICATION NO. | : 11/995514 | |
| DATED | : December 8, 2009 | |
| INVENTOR(S) | : Robie Bonilla Gris | |

It is certified that error appears in the above-identified patent and that said Letters Patent is hereby corrected as shown below:

Title page, item (76) Inventor, delete "Robi" and insert --Robie-- therefor.

Signed and Sealed this

Sixteenth Day of March, 2010

David J. Kappos
*Director of the United States Patent and Trademark Office*